United States Patent
Pattabhi

(10) Patent No.: US 9,732,779 B2
(45) Date of Patent: Aug. 15, 2017

(54) SYSTEM FOR MOUNTING HEATING PANELS ON TO WALL WITHOUT DRILLING HOLES ON THE WALL

(71) Applicant: HBN Agencies, Hyderabad (IN)

(72) Inventor: Vangala Pattabhi, Hyderabad (IN)

(73) Assignee: HBN Agencies, Hyderabad (IN)

( * ) Notice: Subject to any disclaimer, the term of this patent is extended or adjusted under 35 U.S.C. 154(b) by 0 days.

(21) Appl. No.: 14/784,776

(22) PCT Filed: Apr. 11, 2014

(86) PCT No.: PCT/IN2014/000232
§ 371 (c)(1),
(2) Date: Oct. 15, 2015

(87) PCT Pub. No.: WO2014/184798
PCT Pub. Date: Nov. 20, 2014

(65) Prior Publication Data
US 2016/0084284 A1    Mar. 24, 2016

(30) Foreign Application Priority Data
Apr. 17, 2013  (IN) .......................... 1708/CHE/2013

(51) Int. Cl.
*F16B 5/06*     (2006.01)
*F24D 19/02*    (2006.01)
*F16B 2/06*     (2006.01)

(52) U.S. Cl.
CPC .............. *F16B 5/065* (2013.01); *F16B 2/065* (2013.01); *F24D 19/0213* (2013.01); *F24D 19/0223* (2013.01)

(58) Field of Classification Search
CPC ...... F16B 5/065; F16B 2/065; F24D 19/0213; F24D 19/0223; F24D 19/02;
(Continued)

(56) References Cited

U.S. PATENT DOCUMENTS 727,969 A  *  5/1903  Kellogg .................. F24D 19/02
                                                 165/67
950,494 A  *  3/1910  Seidel ..................... F24D 19/02
                                                 165/67
(Continued)

FOREIGN PATENT DOCUMENTS

AT          003289 U1    12/1999
DE          9300704 U1    4/1993
(Continued)

*Primary Examiner* — Muhammad Ijaz
(74) *Attorney, Agent, or Firm* — The Webb Law Firm

(57) ABSTRACT

An improved system for Mounting Heating Panels on to a wall without drilling holes on the wall, including at least one grooved vertical member to maintain a predetermined gap between a wall and a heating panel, the gap allowing natural convection of currents for heat transfer; a plurality of slots provided on an upper portion of the vertical member enabling insertion of the heating panel; a plurality of spacers fixed on the wall using adhesive; wherein the top portion of the panel has at least two fixing holes, and wherein the vertical stand and the upper portion of the panel are fixed to the wall via said plurality of spacers.

3 Claims, 3 Drawing Sheets

(58) Field of Classification Search
CPC ............ F24D 19/0209; F24D 19/0243; F24D 19/0259; F24D 19/0203; F24D 19/024; F24D 2220/2018; F24D 2220/2045
USPC ...................................... 248/205.3, 638, 467
See application file for complete search history.

(56) References Cited

U.S. PATENT DOCUMENTS

| | | | | |
|---|---|---|---|---|
| 1,184,435 | A * | 5/1916 | Enright | F24D 19/02 248/232 |
| 1,393,874 | A * | 10/1921 | Woodling | F24D 19/02 248/234 |
| 1,489,555 | A * | 4/1924 | Tate | F24D 19/02 248/232 |
| 1,523,835 | A * | 1/1925 | Place | F24D 19/02 248/233 |
| 1,582,286 | A * | 4/1926 | Little | F24D 19/02 165/68 |
| 1,794,949 | A * | 3/1931 | Frank | F24D 19/02 248/233 |
| 1,811,538 | A * | 6/1931 | Davis | F24D 19/02 248/233 |
| 1,827,540 | A * | 10/1931 | O'Connell | F24D 19/02 248/233 |
| 1,852,841 | A * | 4/1932 | Healy | F24D 19/02 248/233 |
| 1,892,762 | A * | 1/1933 | Dieterich | F24D 19/02 248/233 |
| 2,195,540 | A * | 4/1940 | Owens | F24D 19/02 248/234 |
| 3,525,494 | A * | 8/1970 | Principe | F24D 19/02 248/222.51 |
| 4,442,827 | A * | 4/1984 | Helman | F24J 2/0433 126/600 |
| 5,623,800 | A * | 4/1997 | Shinkosky | E04F 19/062 52/202 |
| 2001/0032435 | A1 | 10/2001 | Austin | |
| 2003/0221333 | A1* | 12/2003 | Lam | A47G 25/443 34/220 |
| 2008/0010927 | A1* | 1/2008 | Wilson | E04F 13/0803 52/387 |
| 2008/0196333 | A1 | 8/2008 | Tyler | |
| 2011/0069462 | A1* | 3/2011 | Lewis | F16B 5/04 361/759 |
| 2012/0181402 | A1* | 7/2012 | Putz | F16B 5/0233 248/224.8 |
| 2013/0280011 | A1* | 10/2013 | Burd | B64D 11/0023 411/371.2 |
| 2015/0322980 | A1* | 11/2015 | Giacalone | F16B 5/065 244/131 |
| 2016/0084284 | A1* | 3/2016 | Pattabhi | F24D 19/0213 248/205.3 |

FOREIGN PATENT DOCUMENTS

| | | | |
|---|---|---|---|
| DE | 4411603 A1 | 11/1994 | |
| DE | WO 9701735 A1 * | 1/1997 | ............ F24D 19/02 |
| IT | DE 9300704 U1 * | 3/1993 | ............ F24D 19/02 |

* cited by examiner

SYSTEM FOR MOUNTING HEATING PANELS ON TO WALL WITHOUT DRILLING HOLES ON THE WALL

CROSS-REFERENCE TO RELATED APPLICATIONS

This application is the United States national phase of International Application No. PCT/IN2014/000232 filed Apr. 11, 2014, and claims priority to Indian Patent Application No. 1708/CHE/2013 filed Apr. 17, 2013, the disclosures of which are hereby incorporated in their entirety by reference.

FIELD OF THE INVENTION

The present invention relates to a novel method to install a Wall Mounted Heating Panel. More particularly, the invention relates to an improved system for mounting heating panels on a wall without any need for drilling holes in the walls or partitions or use of any tool.

BACKGROUND OF THE INVENTION

Wall Mounted Heating Panels are covered by specifications of International Electrical Common Standards of 60335-1:2001+A1 along with 60335-2-30:2002+A1. It is also covered by UL 2021, issue: 1997 Apr. 16 Ed: 2 Rev: 2006 Jan. 17 as Fixed and Location-Dedicated Electric Room Heaters.

An efficient operation of such panels warrants that the Panels are mounted on to a wall or partition, leaving a predetermined gap between the wall and the Electrical Panel ranging typically from 20 mm to 50 mm.

The principle behind such typical mounting of the Panels is that the air between the Panel and the wall gets heated and a lowered density of air flows upwards and colder air takes its place. Thus natural convection of currents for heat transfer are formed.

One of the requirements of mounting is that the Panel should withstand a weight of 300 lbs on panel (UL 2021, issue: 1997 Apr. 16 Ed: 2 Rev: 2006 Jan. 17).

It is also required that by the help of screw driver it should not be possible to alter the space between wall and Panel.

There are installations for example, heaters that are movable and not fixed to wall. Electrical Heating Panels, in particular Wall Mounted Heating Panels are invariably mounted on to the wall by drilling holes at intervals specified by the manufacturer. Fixtures are then located in these holes and the Panel Mounting System is screwed into the fixture to mount the Panel. It is common art with variations only in the structure mounting systems and variations in components design.

Such existing methods are laborious and need drilling machine and tools to mount the panel. Drilling holes in walls or partition panels damages the mounting surfaces.

In the prior art, the following mounting systems are described to avoid drilling holes in the Panel:—

US 2001032435/A17 describes a convenient attachment which is secured to anchorages but these anchorages are to be embedded in wall and also do not support specifications of IEC and UL.

US 2008196333 A, describes a way of fastening Panel to a bracket by screw but the base plate has to be fixed by screws to be in contact with window frame.

These published inventions avoid drilling of mounting article but needs drilling and fixing anchorages to the wall or screwing anchorages to wood work.

OBJECTS OF THE INVENTION

It is therefore an object of the invention to propose an improved system for Mounting Heating Panels on to wall without drilling holes on the wall.

Another object of the invention is to propose an improved system for Mounting Heating Panels without drilling holes on the wall, in which a predetermined gap between the wall and the heating Panels to allow air flow is maintained.

A further object of the invention is to propose an improved system for Mounting Heating Panels without drilling holes on the wall, which restricts to increase or decrease of the predetermined gap and enables the panel to sustain a vertical load of at least 300 lbs to meet requirements of the technical standard.

SUMMARY OF THE INVENTION

Accordingly, there is provided an improved system for Mounting Heating Panels on to wall without drilling holes on the wall, including at least one grooved vertical member to maintain a predetermined gap between the wall and the heating panel, the gap allowing natural convection of currents for heat transfer; a plurality of slots provided on upper portion of the vertical member enabling insertion of the heating panel; a plurality of spacers fixed on the wall using adhesive; wherein the top portion of the panel having at least two fixing holes, and wherein the vertical stand and the upper portion of the panel are fixed to the wall via said plurality of spacers. The adhesive fixers do not carry any load and can withstand required pulling loads.

BRIEF DESCRIPTION OF THE ACCOMPANYING DRAWINGS

FIG. 1—shows a schematic of the base of improved heater mounting system according to the present invention.

FIG. 2—shows total panel fitting with spacers and screw.

FIG. 3—shows an another embodiment of the system in which stand for double panel is used.

DETAILED DESCRIPTION

Figure 1:
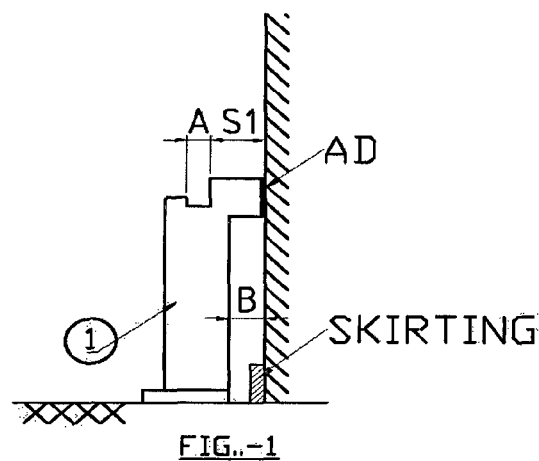
Figure 4:
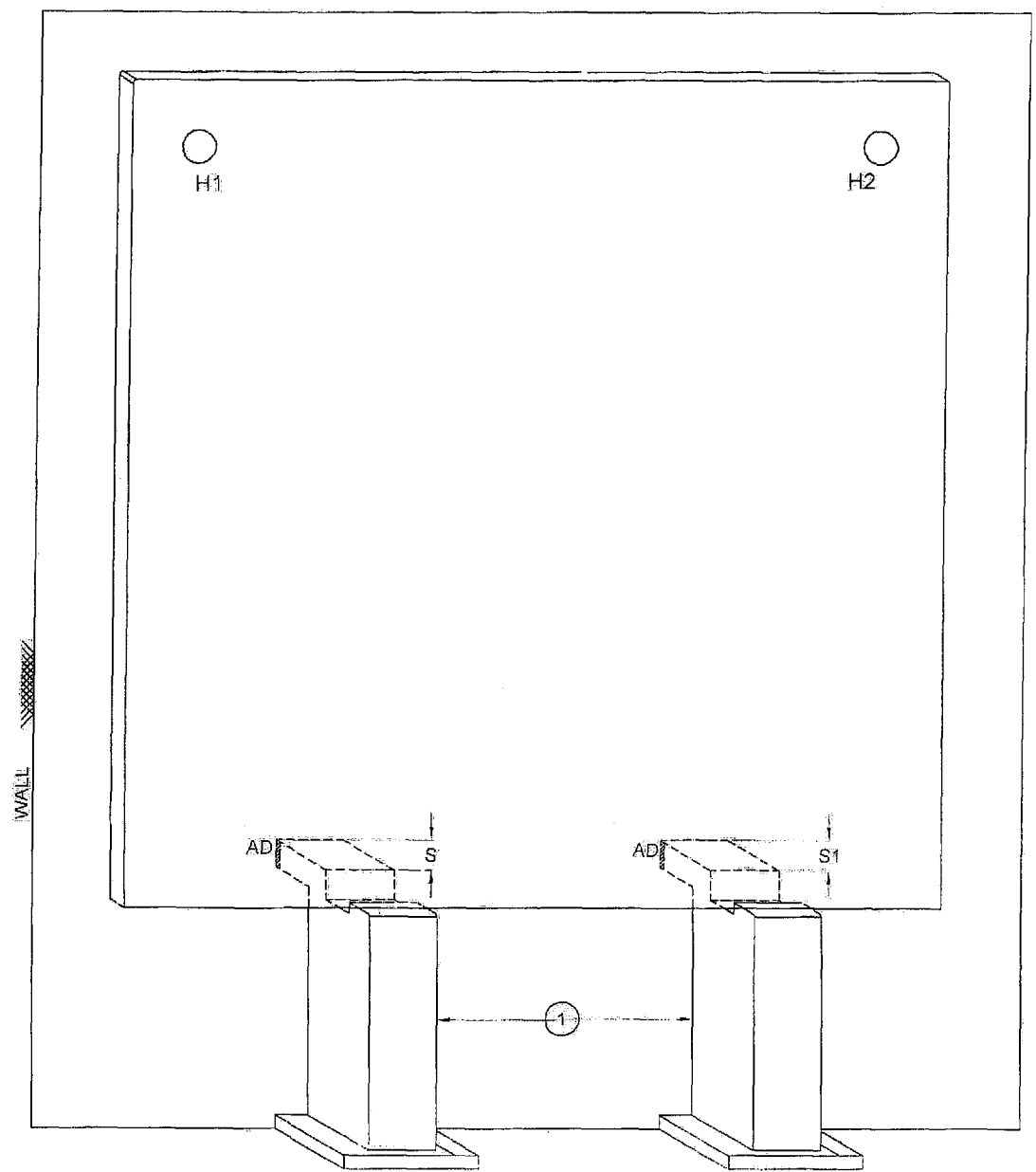
FIG. 4 shows an elevational view of the panel showing the hole positions on the top portion and the spacer and screw that are inserted in these holes.

As shown in FIG. 1, the inventive mounting system includes one or two grooved vertical members affixed to the ground and to the wall to maintain a predetermined gap between the wall and the heating Panel, which ensures natural convection of currents for heat transfer (FIG. 1). The vertical members (1) are glued onto the wall generally accommodating clearance to the skirting of the walls. The vertical members are configured on the upper portions with slots to allow insertion of the Panel, and prevent the panel to slip out. Two holes (H1, H2) are located on the Panel to fix the top portion of the Panel into a plurality of spacers (2), which are fixed on the wall (FIG. 4).

Thus, an effective force comes only on to floor through the vertical members when a weight is put on the Panel. Accordingly, the improved mounting system is constituted regardless of taking into account the bending strength of screws and mounting components.

The vertical members (1, 5) are glued to the wall by an adhesive for example; an adhesive pad with a protection layer, which layer can be removed, and the members pressed to the wall. Area of the adhesive for a stable position is determined based on a particular panel to be fixed. There is also an option for fixing the members on an uncarpeted floor although this is not essential. There are also special adhesives that do not leave a mark on walls when dismantled.

The groove is formed on the top of the vertical members corresponding to the thickness of the panel and whether one or two panels are mounted. The vertical members are fixed with a base on the floor but attached to the wall by the adhesive or the adhesive pad (AD). The holes in the panel are configured on either side at a top of the panel (FIG. 4).

A spacer is attached to the wall by the adhesive. The dimension of the spacer is selected so as to maintain a gap between the panel and wall, which however is dependent on the groove provided on the vertical members.

The Panel is inserted in the groove, and on a top portion of the panel, fixtures or screws go through said two holes in the Panel to be anchored into the spacers.

The Panel is now firmly mounted on the wall to form a-Natural Convection Currents for heat transfer. Further, the improved mounting system allows easy replacement of the Panels when needed.

With two slots on the vertical members, it is possible to mount more than one Panel with an air gap between these Panels as well as between the wall and first Panel.

The inventive system for mounting the Heating Panel on the wall eliminates the need to drill holes on the wall. The weight and forces on the Panel are transferred to the ground by using the vertical members and by anchoring the top holes of the panels into spacers. Further, both the vertical members and the spacers are attached to the wall by adhesives. According to the invention, the improved mounting system allows mounting of more than one Panel, for example, by a dual slot stand for two Panels and using an extended fixture to stage anchoring on a top portion of a corresponding panel for firm attachment to the wall.

The novelty of this invention is better understood by an illustrative example.

The panel is mounted against a wall as a dedicated installation. A stand (1) as shown in FIG. 1 is attached to the wall even though a wider single stand could be adequate. Having two stands with adequate spacing will give better support and safety.

Figure 2:
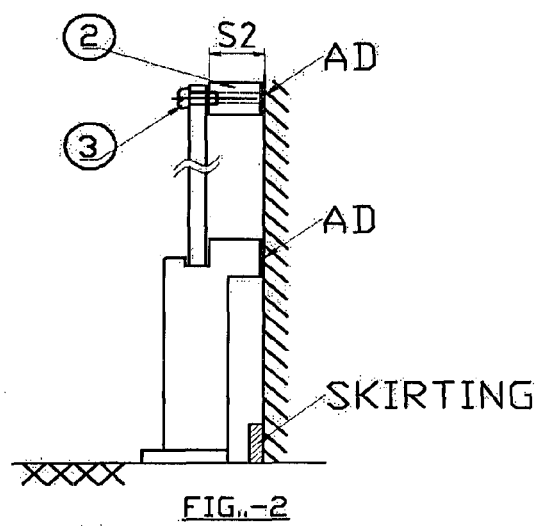
Figure 3:
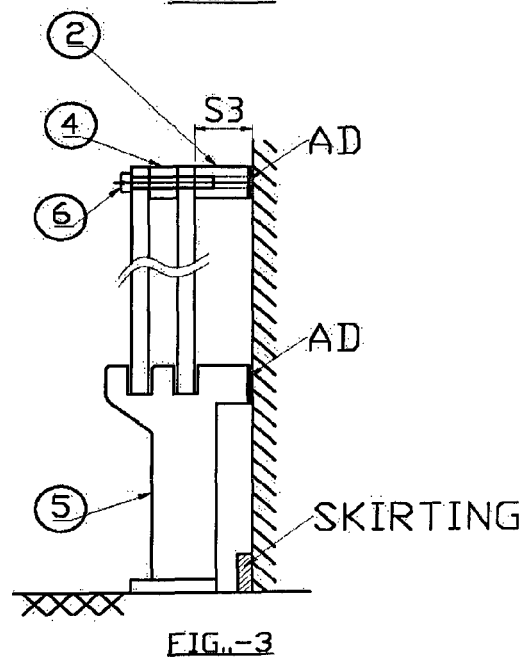

FIGS. 1 and 2 describe the structured stand and specific mounting systems required for convection heaters.

This stand is made in such a way to give clearance to skirting denoted by B. The stand will have a groove A corresponding to the thickness of the Wall Mounted Panel.

The measure S1 denotes the clearance anticipated between Panel and the partition wall or any other wall paneling material.

The stand is fixed with an adhesive pad AD. The protective film is removed from the adhesive pad AD. The stand is pressed against the wall surface so that the adhesive pad AD firmly sticks to the wall. The stand thus firmly attaches to the wall. Two stands with spacing lesser than the width of the panel are fixed (FIG. 4).

The Panel is then fixed with a spacer's length S2 that closely corresponds to S1 length. It is advantageous to have S2 lesser than S1. Spacers are fixed to the panel by attaching a screw (3) into the Spacer through the hole provided in the panel or plurality of holes in the panel.

Figure 5:
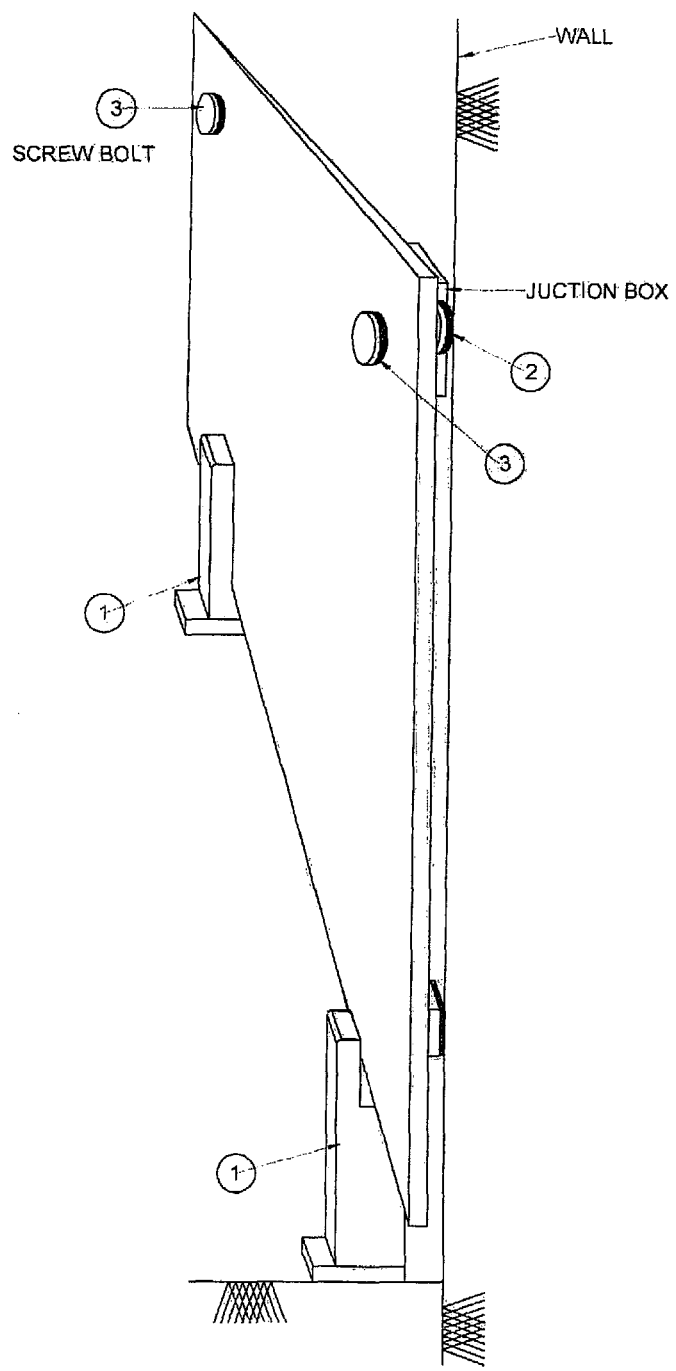
FIG. 5 shows an isometric view of the mounted system and panel.

In FIG. No. 2, a spacer item (2) is fixed on either side of the Panel on a top side firmly by a screw (item 3). The spacers have an adhesive pad attached. After a protective cover is removed from the adhesive pads the Panel is placed in the groove marked A and pressed firmly to the wall so that the Spacer 2 on either side are firmly stuck to the wall. When on one side a junction box is fixed on top of the panel the Spacer on that side is correspondingly reduced in length (FIG. 5).

The panel can be removed if needed by unscrewing (item 3) and lifting the Panel from the groove. Similarly the Panel can be put back in the groove (A) and the Panel can be screwed into the spacer (item 2) for a rigid installation. The shape of the screw is such as to hold the panel and is turned by hand.

This is a novel and very convenient way of fixing a Wall Mounted Panel more particularly a heating Panel with partly convection air currents.

I claim:

1. An improved system for mounting heating panels on to a wall, comprising:
   at least one grooved vertical member configured to maintain a predetermined gap between the wall and the heating panels, the at least one grooved vertical member including an upper portion configured to be in contact with the wall and a lower portion configured to be in contact with a floor, the predetermined gap allowing natural convection of currents for heat transfer;
   at least two grooves provided on the upper portion of the vertical member enabling insertion of a respective one of the heating panels; and
   a plurality of spacers configured to be fixed on the wall using adhesive pads;
   wherein a top portion of each of the heating panels has at least two fixing holes,
   wherein the spacers are configured to fix the top portion of the respective one of the heating panels to the wall to support the heating panels on to the wall without drilling holes on the wall, and without the use of tools,
   wherein at least two of said plurality of spacers, which are affixed on outer sides of the heating panels, are provided with tapped holes to receive a screw configured to clamp the spacers on the top portion of the respective one of the heating panels, and
   wherein the spacers are provided as separate components from the grooved vertical member.

2. The system as claimed in claim 1, wherein no hand tools or drilling are required to fix the improved system.

3. An improved system for mounting a heating panel on to a wall, comprising:
   at least one grooved vertical member configured to maintain a predetermined gap between the wall and the heating panel, the at least one grooved vertical member including an upper portion configured to be in contact with the wall and a lower portion configured to be in contact with a floor, the predetermined gap allowing natural convection of currents for heat transfer;
   at least one groove provided on the upper portion of the vertical member enabling insertion of the heating panel, the at least one groove of the at least one grooved vertical member being substantially centered along a central vertical axis of the at least one grooved vertical member; and
   a plurality of spacers configured to be fixed on the wall using adhesive pads;

wherein a top portion of the heating panel has at least two fixing holes, wherein the spacers are configured to fix the top portion of the heating panel to the wall to support the heating panel on to the wall without drilling holes on the wall, and without the use of tools, wherein at least two of said plurality of spacers, which are affixed on outer sides of the heating panel, are provided with tapped holes to receive a screw configured to clamp the spacers on the top portion of the heating panel, and wherein the spacers are provided as separate components from the grooved vertical member.

* * * * *